United States Patent [19]

Schiebold et al.

[11] Patent Number: 5,773,904
[45] Date of Patent: Jun. 30, 1998

[54] ELECTRIC MACHINE HAVING AT LEAST ONE CLUTCH

[75] Inventors: Stefan Schiebold, Schweinfurt; Wolfgang Thieler, Hassfurt, both of Germany

[73] Assignee: Mannesmann Aktiengesellschaft, Düsseldorf, Germany

[21] Appl. No.: 505,340

[22] PCT Filed: Jan. 3, 1994

[86] PCT No.: PCT/DE94/00006

§ 371 Date: Oct. 2, 1995

§ 102(e) Date: Oct. 2, 1995

[87] PCT Pub. No.: WO94/19856

PCT Pub. Date: Sep. 1, 1994

[30] Foreign Application Priority Data

Feb. 19, 1993 [DE] Germany .......................... 43 05 533.8
May 25, 1993 [DE] Germany .......................... 43 18 949.0

[51] Int. Cl.[6] .................................................. B60K 9/04
[52] U.S. Cl. ................................. 310/92; 310/76; 310/78; 310/96; 310/98; 310/100; 192/84.1; 180/65.2; 477/7; 477/13
[58] Field of Search ............................... 310/92, 96, 101, 310/76, 78, 98, 102 A, 102 R, 100, 75 D, 75 R, 103, 112, 114, 67 R; 180/65.2, 165; 192/84.1; 477/7, 13

[56] References Cited

U.S. PATENT DOCUMENTS

| 2,624,856 | 1/1953 | Younger ..................................... 310/74 |
| 4,363,984 | 12/1982 | Torii et al. .............................. 310/156 |
| 4,405,031 | 9/1983 | Rotter ..................................... 180/165 |
| 4,499,965 | 2/1985 | Oetting et al. .......................... 180/165 |
| 4,533,011 | 8/1985 | Heidemeyer et al. ................. 180/62.5 |
| 5,209,332 | 5/1993 | Okayasu ................................. 192/0.52 |
| 5,337,848 | 8/1994 | Bader et al. ........................... 180/62.5 |

*Primary Examiner*—Thomas M. Dougherty
*Assistant Examiner*—Karl I. E. Tamai
*Attorney, Agent, or Firm*—Cohen, Pontani, Lieberman & Pavene

[57] ABSTRACT

An electric machine which can be operated optionally as a motor or generator and in particular can be installed in the drive train of a motor vehicle with a hybrid drive. The machine includes a stator and a rotor of substantially cylindrical shape, The rotor is positioned about the stator to form a circumferential air gap between the stator and the rotor. An integrated switchable clutch is provided for the transmission of torque. The rotor is arranged on the outside (external-rotor machine) of the stator and the clutch is arranged within the stator.

8 Claims, 4 Drawing Sheets

ELECTRIC MACHINE HAVING AT LEAST ONE CLUTCH

BACKGROUND OF THE INVENTION

1. Field of the Invention

The present invention relates to an electric machine having at least one integrated clutch.

2. Description of the Prior Art

As part of the effort directed at reducing the specific fuel consumption of motor vehicles, a vehicle with a hybrid drive has become known which has an internal combustion engine and a traditional mechanical drive train with transmission, as shown diagrammatically in FIG. 1. Between the internal combustion engine 6 and the transmission 7 there is an electric machine which is developed as an asynchronous machine and can optionally operate as an electric motor (for the driving of the vehicle or for starting the internal combustion engine 6) or as an electric generator. Outside of and positioned axially on opposite sides of the inner rotor 1 of the electric machine, there are two switchable clutches 3, 4 for transmitting torque to the rotor. The stator 2 of this electric machine lies radially on the outside of the rotor 1 and can be connected by wires to an electric battery 5 for transmitting drive energy to the rotor 1.

The rotor 1 has a two-fold function since it also operates as a flywheel for the internal combustion engine 6. For this purpose, in corresponding operating phases, the clutch 3 of the electric machine which faces the internal combustion engine 6 is engaged so that the crankshaft 8a of the internal combustion engine 6 is connected for rotation with the rotor 1. In order to transmit mechanical drive energy via the crankshaft 8b to the transmission 7, the clutch 4 is also engaged for rotation with the rotor 1. In operating phases during which a purely electric drive is supplied with a charging of current from the battery 5, the clutch 3 facing the internal combustion engine 6 is opened and only the other clutch 4 is engaged with the rotor 1. This state of engagement of the clutches 3, 4 can also exist during phases in which the vehicle is braked, the electric machine being operated as a generator for charging the battery 5. In order to increase the braking effect, the first clutch 3 can also be engaged with the rotor 1 so that the internal combustion engine 6 also acts as a brake.

By the direct flanging of the clutches 3, 4 on the sides of the rotor 1, a relatively compact construction is obtained. One disadvantage of this known solution resides, in particular, in the fact that the power and the maximum torque of the electric machine are considerably less than the corresponding values of the internal combustion engine 6. This hybrid drive therefore permits only very modest driving performance in phases of purely electric operation. Fan cooling is provided for removal of the loss power which is converted into heat.

SUMMARY OF THE INVENTION

The object of the present invention is to improve an electric machine of this type providing an even more compact construction in the axial direction, a substantially higher torque and a higher power density and, at the same time, assuring high operation dependability.

BRIEF DESCRIPTION OF THE DRAWINGS

The present invention will be explained in further detail below with reference to the drawing, in which.

DETAILED DESCRIPTION OF THE PREFERRED EMBODIMENTS

Figure 1:
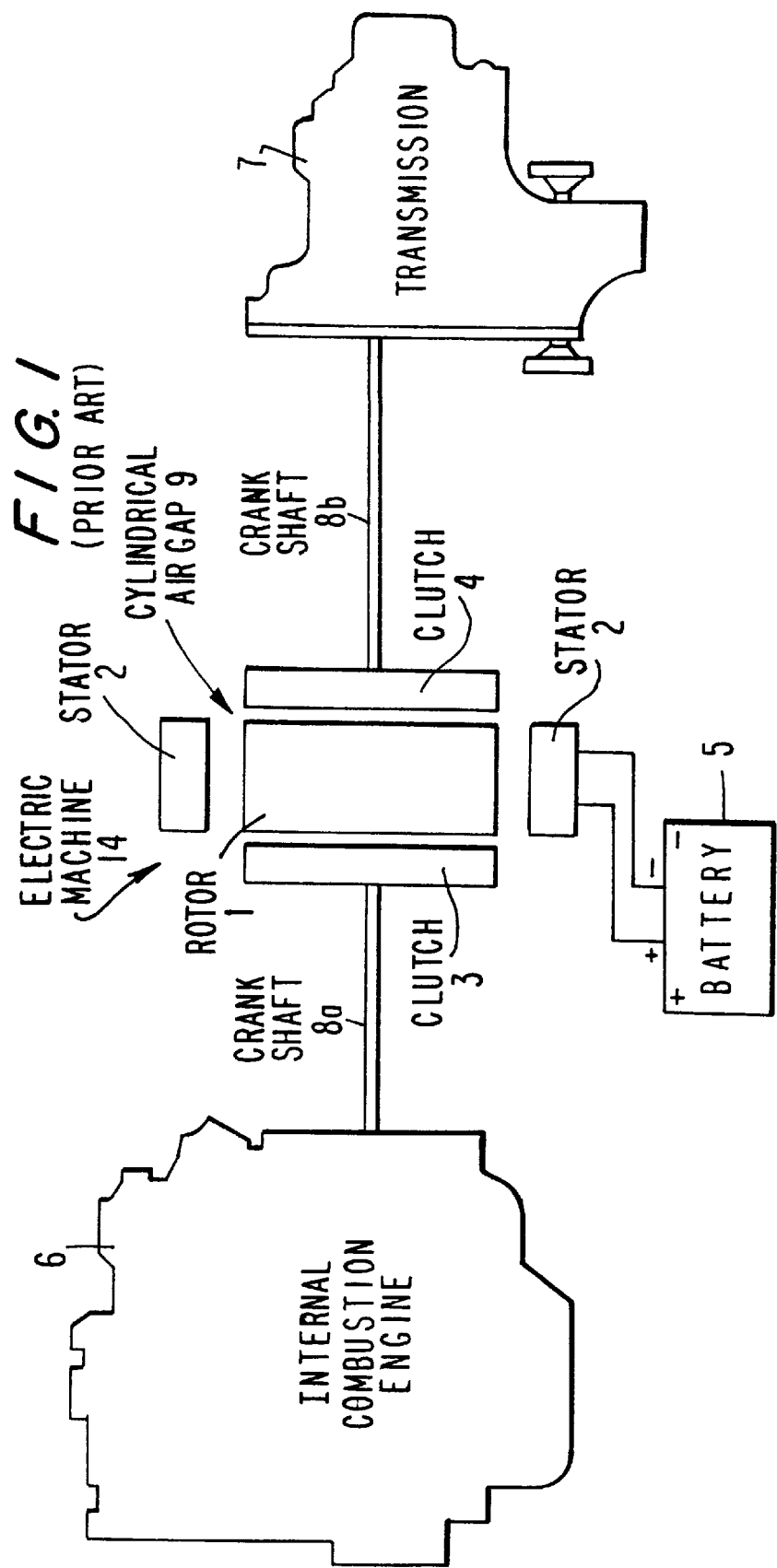
FIG. 1 shows a drive diagram for a known hybrid drive.

The manner of operation of the known hybrid drive of FIG. 1 has already been discussed in detail. The drive shown in FIG. 2 operates, basically, in substantially the same manner, so that, in essence only the differences will be taken up in further detail below. Parts having the same function have been provided in FIGS. 2 to 4 with the same reference numerals as in FIG. 1.

Figure 2:
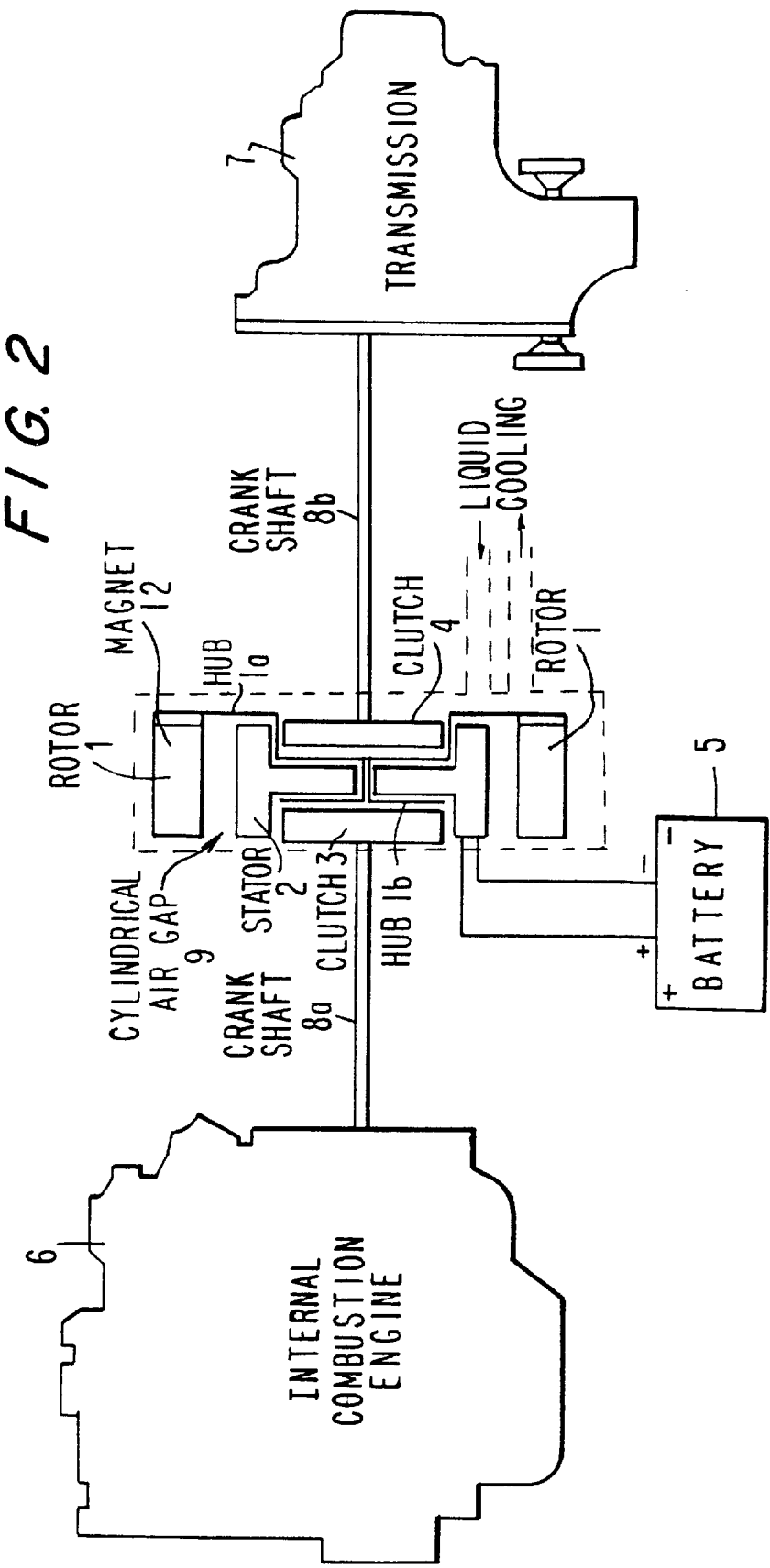
FIG. 2 shows a drive diagram for a hybrid drive having an electric machine in accordance with the invention.

Differing from FIG. 1, the electric machine of FIG. 2 which can be operated optionally as an electric motor or as an electric generator, is developed as an external-rotor motor and therefore has a rotor 1 of substantially cylindrical shape arranged on its outside. It is a synchronous machine with electronic commutation. The stator 2, provided with electric windings (not individually shown) is arranged on the inside of the rotor 1. The rotor 1 is provided in corresponding manner with permanent magnets. The electronic commutation for the feeding of current to the stator 2 has not been shown separately. Between the two operating parts (rotor 1, stator 2) of the electric motor there is a cylindrical air gap 9. This manner of construction permits very high moments of rotation, since the air gap 9 can be shifted very far towards the outside. Similar to a vehicle wheel, the rotor 1 has a hub part 1a which is partially pulled inward dishwise in cross section and is mounted in the stator 2, it forming an operating part of the switchable clutch 4 itself or being firmly attached to the operating part of the switchable clutch 4. The other functional part of the clutch 4 is attached to the crankshaft 8b which leads to the transmission 7. The clutch 4 is recessed coaxially from the outside into the hub part 1a of the rotor 1 and thus lies at the same time also within the stator 2. The clutch 4 preferably extends only insignificantly if at all beyond the end limiting surface of the contour of the stator 2 and accordingly also of the rotor 1. In this way, an extremely compact construction in axial direction is assured. For many cases of use, it is advantageous to provide means (not shown) for the damping of oscillatory oscillation in the clutch.

The providing of the electric machine with one clutch alone in itself constitutes an embodiment of the invention which is suitable for many cases of use. In cases which, like the example of the hybrid drive of FIG. 2, require a second clutch (clutch 3), such a clutch 3 is also arranged in a corresponding manner within the stator 2. For this purpose, a second hub part 1b is connected to the hub part 1a of the rotor 1, the second hub part 1b at the same time forming an operating part of the switchable clutch 3 or else being firmly attached to an operating part of the clutch 3. The second operating part of the clutch 3 is attached, fixed for rotation, with the crankshaft 8a. The two clutches 3, 4 are preferably completely recessed in the volume of the stator 2 or rotor 1 so that the axial structural length can be kept extremely short.

Different types of clutches may be used in the present invention, such as multiple-disk clutches or hydraulically or pneumatically actuated dry-plate clutches. Use of electrically actuated magnetic-powder clutches is particularly advantageous. Regardless of the nature of the clutch it is advisable to effect the engagement and disengagement automatically.

The manner of construction as an outside-rotor machine with permanent-magnetic excitation assures high moments of rotation and high power with comparatively very compact dimensions. Furthermore, the rotor 1 can be used, in a known manner, as a flywheel for the internal combustion engine 6, in which case the flywheel acts considerably better than in the prior art, since it is arranged on a cylindrical surface having a larger radius. For the removal of the heat produced by the loss of power in the windings of the stator 2, liquid cooling (schematically shown) is preferably provided, it operating more effectively than air cooling and permitting a more compact construction.

Figure 3:
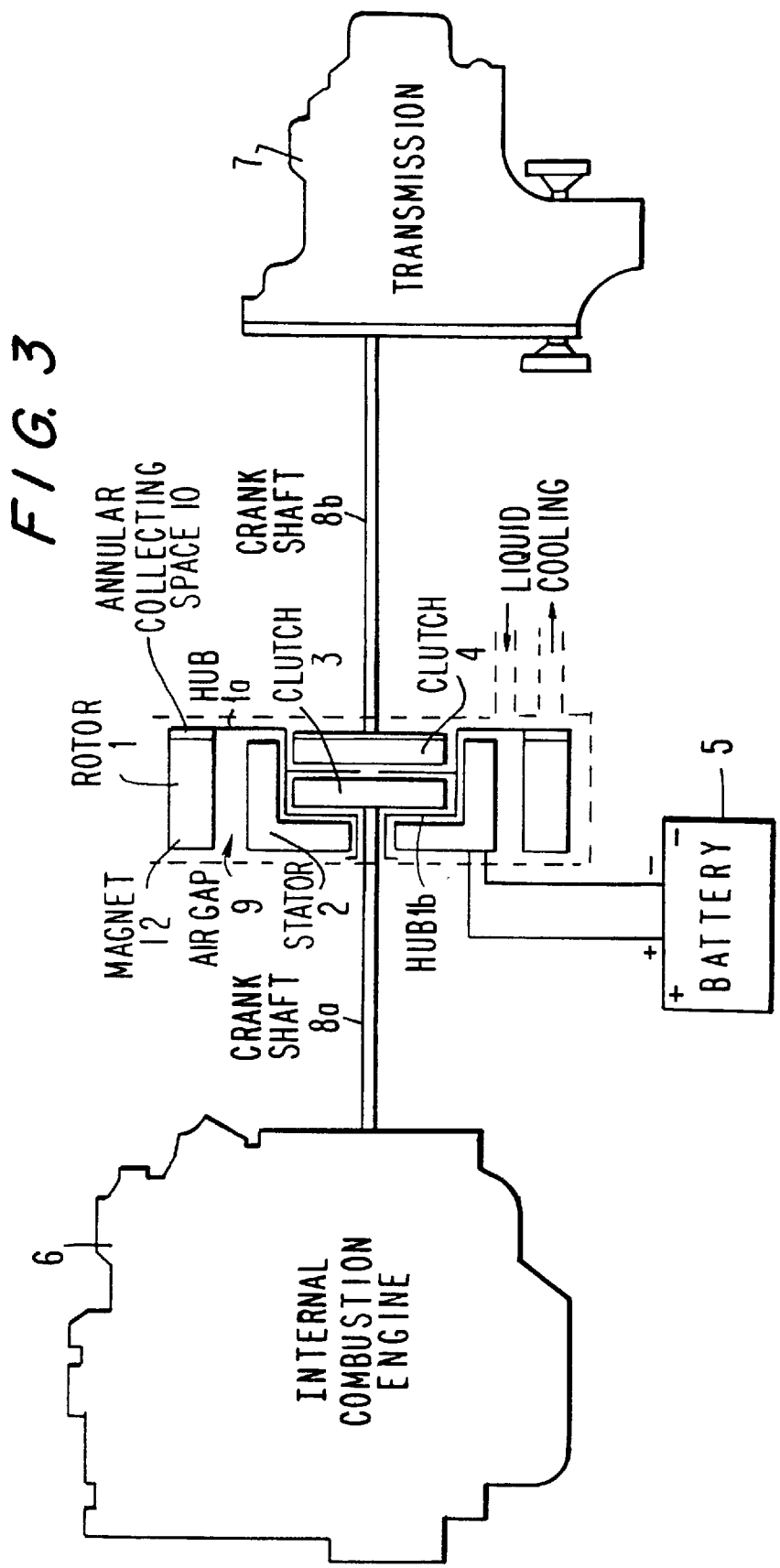
FIG. 3 shows a modified embodiment of the electric machine of FIG. 2.
Figure 4:
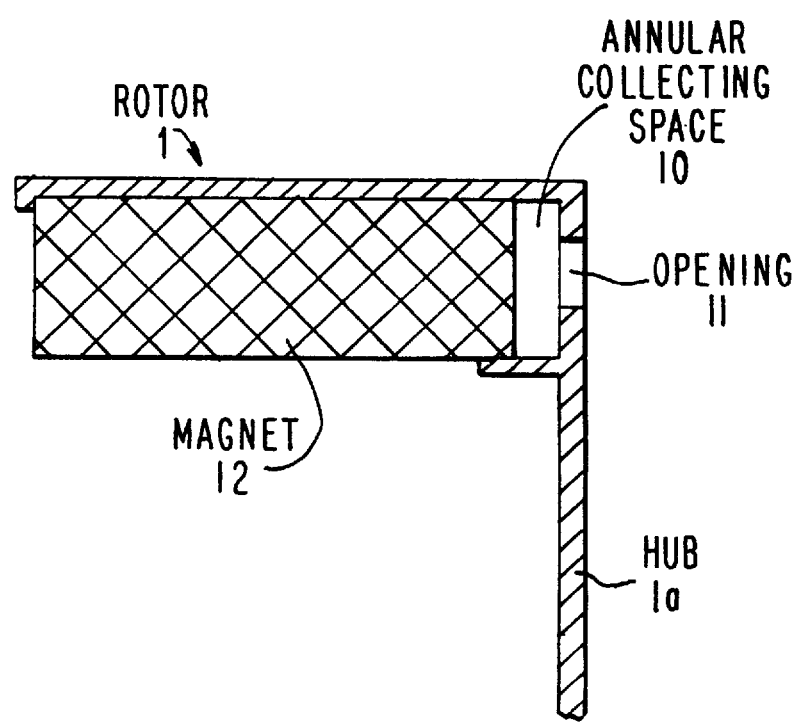
FIG. 4 shows a detail of a rotor of the electric machine of the invention.

A modified embodiment of the invention as compared with FIG. 2 also including two clutches 3, 4 is shown in FIG. 3. Here, the clutches 3, 4 are arranged axially directly one behind the other and are both positioned on and introduced from the same side into the stator 2, which in this case has a pot-shaped housing. This manner of construction, which in its fundamental function corresponds entirely to that of FIG. 2, has the great advantage that the actuating members for the clutches can be connected from the transmission side and direct flanging onto the engine crankshaft, without leaving an axial intermediate space, is possible. The air gap 9 is covered on the side facing the transmission 7 by the housing-like hub part 1a. In this way, dust-like abrasion from the clutches 3, 4, which might contain ferromagnetic components cannot easily reach the permanent magnets of the rotor 1 and be deposited there in the region of the air gap 9, possibly leading to disturbances. The dust would have had to travel around the rotor housing on its outer side in order to penetrate into the air gap 9 on the side facing the internal combustion engine 6. In order, to obtain even greater protection against disturbances of this kind, it may be advisable, as shown in FIG. 4, to create an annular collecting space 10 between the permanent magnets 12 and the hub part 1a which is sealed off from the air gap 9, is accessible through several openings 11 in the hub part 1a on the side facing the transmission 7 and can be divided into several separate collecting spaces. If ferromagnetic abrasion from the clutches 3, 4 should now emerge on the outside of the transmission side, it would have to travel outward along the hub part 1a. Before reaching the outer circumference, the ferromagnetic abrasion would have to pass the openings 11 and would, in this connection, so to speak be "sucked-in" by the permanent magnets 12 and held fast magnetically in the collecting space 10, eliminating the possibility of causing any damage.

The embodiment of the invention with a permanently excited synchronous machine also has another important advantage over known embodiments with an asynchronous machine. The latter are very sensitive to changes in the size of the air gap, which must lie within the range of 0.1 to 0.2 mm in order to assure effective operation. Deviations from this range result in considerable reductions in efficiency. This has the result that asynchronous machines (directly flanged onto the crankshaft) are very sensitive to the crankshaft clearance of the internal combustion engine which is present in all cases. If high efficiencies are thus to be assured, expensive additional measures for a mounting with corresponding narrow tolerances must be taken. In case of the use of synchronous machines, such an additional expense, on the other hand, is not necessary.

The advantages of the invention will become clearer from the following examples:

Comparative Example:

A vehicle with a hybrid drive in accordance with FIG. 1 has, as its drive unit, a diesel engine having a power of 55 kW and a maximum torque of 110 Nm. The diameter of the electric asynchronous machine (motor/generator) is about 250 mm and its axial structural length about 85 mm. With these dimensions, the electric power lies (2000 $min^{-1}$) at 7.5 kW and the maximum continuous torque is about 80 Nm. For purely electric operation there results therefrom correspondingly modest operating powers as compared with operation of the internal combustion engine (power max. 14%, torque max. 73%).

Invention:

Taking as the basis the same internal combustion engine, one suitable embodiment of the invention in accordance with FIG. 3 has an electric synchronous machine with permanent-magnet excitation and with a diameter of 320 mm, and an axial structural length of 147 mm. The maximum power (1800 $min^{-1}$) is 25 kW and the maximum torque 400 Nm. As compared to the example in accordance with FIG. 1, the power is therefore 230% higher and the maximum torque 400% higher, although the dimensions of the machine have increased only comparatively slightly (diameter 28%, structural length 73%). In addition to this, there is the advantage of the improved flywheel action for the internal combustion engine, due to the external-rotor construction. In particular, the considerable increase in the torque results in essential advantages if the electric motor is to operate as a starter for the internal combustion engine.

We claim:

1. An electric external-rotor machine for a motor vehicle, comprising:

a stator (2) having a pot-shaped housing with an open side; a substantially cylindrical rotor (1) positioned about and separated from said stator (2) forming an air gap (9) between said rotor (1) and said stator (2), said rotor including an axis extending therethrough; an internal combustion engine having a crank shaft; at least one integrated switchable clutch (3, 4) positioned between said rotor and crank shaft within said stator (2) for transmitting torque to the rotor (1); a second clutch positioned within said stator, each of said at least one clutch and said second clutch including a face side and being positioned along said axis of said rotor (1) in opposing end regions of said stator (2), said face sides of said at least one clutch and said second clutch opposing each other; and, a first hub provided with a plurality of recesses therethrough, said first hub being connected to the rotor so as to extend across said rotor and said stator on said open side of the stator housing to seal the air gap.

2. The machine of claim 1, wherein said machine is a motor.

3. The machine of claim 1, wherein said machine is a generator.

4. The machine of claim 1, further comprising a transmission shaft, said at least one clutch being positioned between said rotor and at least one of said crankshaft and said transmission shaft.

5. The machine of claim 1, wherein said rotor (1) further includes a plurality of magnets (12) and said machine operates as a synchronous machine with electronic commutation, said first hub being separated from said plurality of magnets so as to define a collecting space therebetween which is accessible through the plurality of recesses in the first hub.

6. The motor of claim 1, wherein said at least one clutch is a magnetic powder clutch.

7. The motor of claim 1, wherein said at least one clutch is one of a multiple disc, hydraulically actuated or pneumatically actuated dry plate clutch.

8. The motor of claim 1, wherein said at least one clutch is positioned within said stator along said axis of said rotor, said at least one clutch at most extending a minimum distance beyond the stator housing.

* * * * *